United States Patent [19]

Cillario

[11] Patent Number: 4,458,568
[45] Date of Patent: Jul. 10, 1984

[54] METHOD OF CUTTING OUT SHELL HALVES FORMED IN A WAFER SHEET

[75] Inventor: Lorenzo Cillario, Alba, Italy

[73] Assignee: Ferrero S.p.A., Alba, Italy

[21] Appl. No.: 326,563

[22] Filed: Dec. 2, 1981

[30] Foreign Application Priority Data

Dec. 15, 1980 [IT] Italy ............................. 68906 A/80

[51] Int. Cl.³ ............................................. B26D 3/00
[52] U.S. Cl. .......................................... 83/54; 83/409;
   83/409.2; 83/422; 83/435.1; 83/914; 426/518
[58] Field of Search ...................... 83/54, 409.2, 409.1,
   83/409, 415, 425, 861, 870–874, 914, 651.1, 661,
   435.2, 422, 423, 435.2; 99/450.6, 537; 426/282,
   138, 518, 514

[56] References Cited

U.S. PATENT DOCUMENTS

| 454,931 | 6/1891 | Heinsdorf | 83/409.2 |
| 1,118,610 | 11/1914 | Winchester | 83/409.2 |
| 1,448,472 | 3/1923 | Thompson | 83/409.1 |
| 3,093,021 | 6/1963 | Barron | 83/661 X |
| 4,002,091 | 1/1977 | White | 83/873 |
| 4,211,131 | 7/1980 | Fenn et al. | 83/871 X |
| 4,300,423 | 11/1981 | Price | 83/409.2 X |

FOREIGN PATENT DOCUMENTS 487018 6/1938 United Kingdom ................. 83/425

Primary Examiner—James M. Meister
Attorney, Agent, or Firm—Bernard, Rothwell & Brown

[57] ABSTRACT

The shell halves are separated from the web portion of the wafer sheet by means of a sawing operation, effected parallel to the plane of the sheet. When two halves cut out in such way are assembled to form a shell enclosing a filling, the sawn areas mate each other so that they are hidden from sight. This invention has application to the manufacture of candy of the type having a shell and a filling.

1 Claim, 4 Drawing Figures

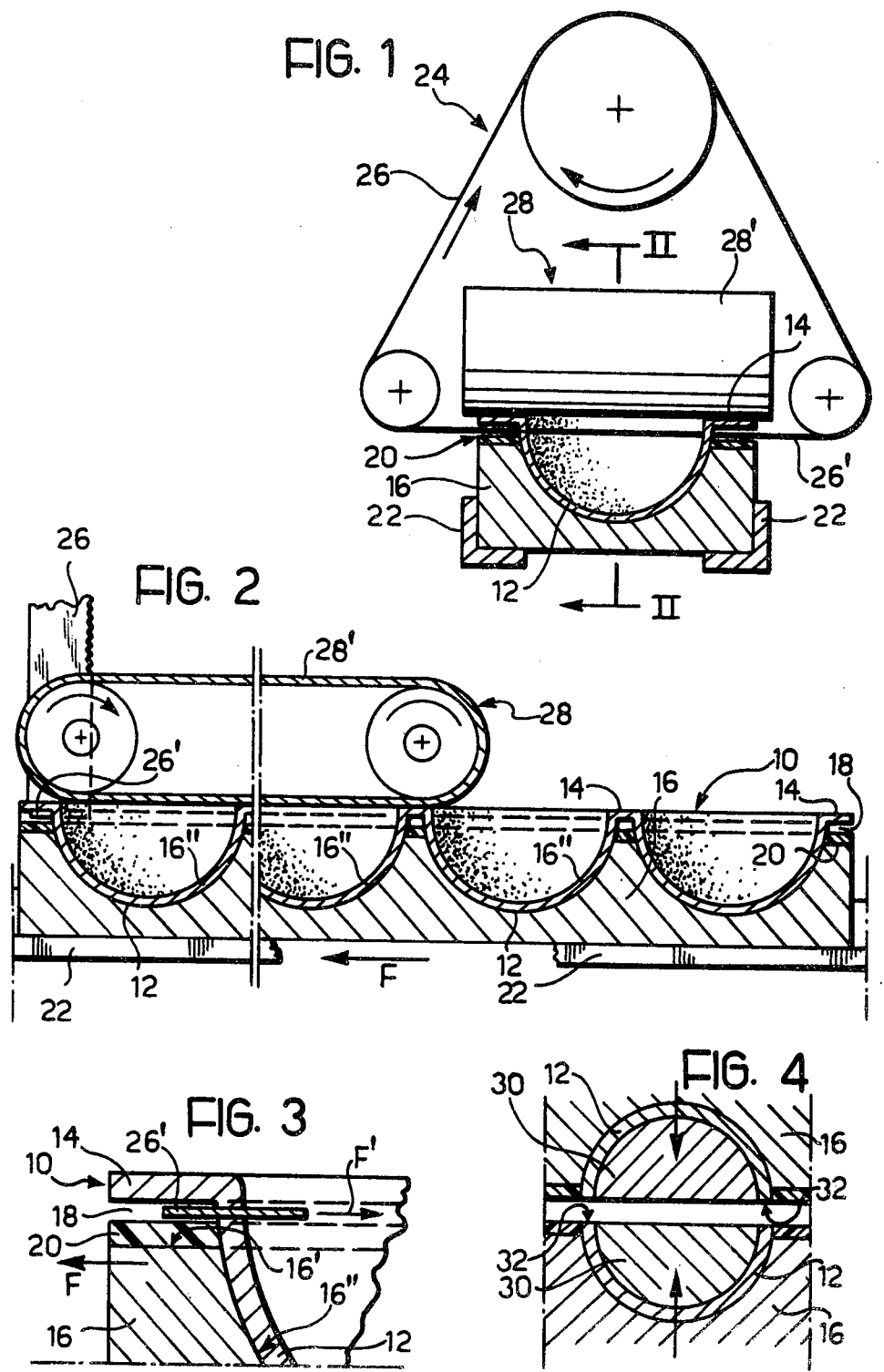

METHOD OF CUTTING OUT SHELL HALVES FORMED IN A WAFER SHEET

A number of sweet and confectionery products comprise a filling enclosed in a shell formed by two halves of wafer. The shell may have various dimensions, depending upon the product, and various shapes (e.g. spherical, ovoidal, a stick shape, a shape of a double truncated pyramid, etc).

For obtaining the halves, a wafer sheet is first prepared by baking on a multi-recessed plate, having rows and ranks of mutually identical recesses of a shape complemental to that of the halves. In the wafer sheet so obtained all the halves are in relief on one side of the wafer sheet and are interconnected among them by a continuous planar, wall of wafer, hereinafter briefly designated as "web portion".

According to the state of the art, the halves are separated from the web portion by punching carried out throughout the web portion along the whole base perimeter of each of the valves. Therefore, an array of steel punches is required, having the dimensions and shape corresponding to that of the base of the halves. Substantial investment costs are obviously derived therefrom. In the case of halves with rectilinear edges the separation may be effected by means of a sawing operation, in which the saw extends perpendicularly to the plane of the wafer sheet, similarly to the sawing of an ordinary panel of wood or of other material. In such case, in order to separate simultaneously more halves, a plurality of parallel operating saws is required which involves constructional complications. On the other hand, effecting the separation both by means of punches and by means of sawing, on each half cut out in such way appears visible, all around the punched area of the base as rough and notched and therefore bad-looking in the finished product.

Furthermore, it is difficult to effect the punching or sawing in perfect "register" with the contour of the half, with the consequence that at the base of the so separated half appears a step which is troublesome in the operation of wrapping or packaging of the product.

The main object of the present invention is to avoid the above drawbacks. Further objects and advantages will result evident from the following description.

The method according to the invention, for cutting out shell halves formed in a wafer sheet, is essentially characterized by the fact that the halves are cut out by means of a sawing operation carried out parallel to the plane of the web of wafer sheet. In this way, the separation of the halves from the web portion of the wafer sheet becomes completely independent from the shape and from the dimensions of the halves. Moreover, the resulting sawn surface is located within the thickness of the half, that is, the surface is "frontal" rather than "lateral", so that, when two halves are assembled to form the shell, their surfaces produced by the sawing mate each other and therefore they are no more visible from the outside.

According to an advantageous embodiment, the method according to the invention comprises the steps of: supporting the halves at the convex side in corresponding complementary cavities formed in a planar face of a common support while leaving between said face and the web portion of the wafer sheet a free interstice; and feeding a sawing tool from one end to the other of said interstice while sawing the halves at a location adjacent the web portion. Preferably, the halves are sawn while they are pressed against said support. Advantageously, the sawing is carried out by means of a band saw; but one can employ also an endless wire saw, in which the whole surface of the wire shows tiny teeth (as in the wire saws employed in the rock cutting).

In the appended drawings:

FIG. 1 is a partially cross-sectional diagrammatic front view, illustrating a wafer sheet during the sawing by means of a band saw;

FIG. 2 is a longitudinal cross-sectional view along the line II—II of FIG. 1;

FIG. 3 shows in a greater scale a detail of FIG. 2, and

FIG. 4 shows in a cross-sectional view two halves obtained according to the invention during the coupling stage to form the finished article.

In the drawings, reference 10 denotes a wafer sheet comprising a row of halves 12 formed integrally with the planar web portion 14. All the halves 12 are located at the same side of the plane of the web portion, according to the conventional art. In the arrangement shown, the halves 12 are of hemispherical shape, but they may have any desired shape and dimensions. Of course, for production reasons, all the halves are identical. In the practice the wafer sheet may comprise a plurality of rows of halves; in the drawings one row only has been shown, for simplicity of illustration.

For the sawing operation, the wafer sheet 10 is superposed on a support 16 consisting of an elongated parallelepipedic block of a convenient material (e.g. metal or plastic of the type allowed by the regulations in force). The support 16 has an upper planar face 16', which is formed with a row of cavities 16'' of a form complemental to the halves 12. The cavities 16'' are mutually spaced in a way such that each of them receives the respective half in mutual matching condition. However, the depth of the cavities 16'' is smaller by a few millimeters with respect to the height of the halves 12 over the web portion 14 so that between the latter and the support 16 an interstice 18 is left free. Preferably, for reasons which will be explained later on, the upper face of the support 16 is coated with a layer 20 of a polyamidic resin or of other material with a low friction coefficient; therefore the width of the interstice 18 (in a vertical direction) is measured between the web portion 14 and the layer 20. For carrying out the cutting, the support 16 is placed on horizontal guides 22 which guide it in the direction of its length, indicated by the arrow F in FIGS. 2 and 3. Transversely to the guides 22 a band saw 24 is located, the band blade of which is denoted by 26 and comprises an active run 26' located in a horizontal plane coincident with the horizontal mid-plane of the interstice 18. The vertical width of the latter is chosen according to the thickness of the blade 26, in the amount of the minimum necessary to permit a free passage of the blade between the web portion 14 and the anti-friction layer 20. Typically, said width amounts to from two to three times the thickness of the blade. Theoretically, in operation, the blade should not contact the layer 20. Nevertheless, in practice, the active run 26' of the blade is easily subjected to vertical vibrations, and therefore the presence of the layer 20 is useful to avoid the direct contact of the blade with the block 16. The band saw 24 and the guides 22 are mounted in stationary position, so that the forward displacement of the block 16 with the wafer sheet 10 in the direction F translates into a relative feed displacement of the active run 26' of the blade 26 in the direction F' opposite to F (FIG. 3) while said run is sawing the halves in direct proximity to the web portion 14.

According to an advantageous embodiment, it is recommendable to gently press the halves against the support 16 while they are being sawn. In the illustrated case such gentle pressure is effected by means of endless belt pressing device 28 extending from the cutting zone (FIG. 2) along a convenient length of the wafer sheet located upstream of said zone. As it may be seen in FIG. 1, the width of the ribbon 28' of the pressing device 28 extends on the whole width of the wafer sheet.

Once the sawing is carried out, the web portion of the wafer sheet is removed (by means not shown in the drawings), while the halves 12 remain located in the respective cavities 16" of the block 16. This latter is transferred to the filling station, at which the halves are filled with a filling. In FIG. 4 is shown a pair of halves 12 with their respective portions of filling 30 in a mutual position immediately preceding the coupling. It may also be seen in FIG. 4 how the surfaces 32 which are produced by the sawing process hereinbefore described are brought into frontal reciprocal mating, so that, in the finished article, they are no longer visible from the outside. It is intended that the method according to the invention may be in practice carried out also by means different from those shown in the drawings although, at the present time, the illustrated means seem to constitute the best embodiment.

I claim:

1. Method of cutting out edible food or confectionery shell halves formed in a wafer sheet of edible food or confectionery material having a web interconnecting a plurality of shell halves comprising:
   (a) supporting the shell halves at the convex side in corresponding complementary cavities formed in a planar face of a common support while leaving between said face and the web portion of the wafer sheet a free interstice;
   (b) feeding a sawing tool across said interstice;
   (c) pressing at least a portion of the wafer sheet of shell halves against the common support while performing step (d) so that the wafer sheet is pressed against the common support in the area of sawing; and
   (d) moving said common support relative to said sawing tool while severing the halves by sawing said wafer sheet on a parallel plane with, and at a location immediately adjacent to, said web portion.

* * * * *